United States Patent
Inoue et al.

(10) Patent No.: US 11,978,932 B2
(45) Date of Patent: May 7, 2024

(54) METHOD OF DETECTING DEGRADATION OF MEMBRANE ELECTRODE ASSEMBLY IN FUEL CELL SYSTEM

(71) Applicant: HONDA MOTOR CO., LTD., Tokyo (JP)

(72) Inventors: Kazuhide Inoue, Wako (JP); Kuniaki Ojima, Wako (JP); Tomoyuki Inoue, Wako (JP); Osamu Ogami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 582 days.

(21) Appl. No.: 17/175,837

(22) Filed: Feb. 15, 2021

(65) Prior Publication Data

US 2021/0257634 A1    Aug. 19, 2021

(30) Foreign Application Priority Data

Feb. 19, 2020  (JP) .................. 2020-025871

(51) Int. Cl.
*H01M 8/04664* (2016.01)
*G01L 19/00* (2006.01)
*H01M 8/0438* (2016.01)
*H01M 8/1004* (2016.01)

(52) U.S. Cl.
CPC ..... *H01M 8/04671* (2013.01); *G01L 19/0007* (2013.01); *H01M 8/04388* (2013.01); *H01M 8/04402* (2013.01); *H01M 8/1004* (2013.01); *H01M 2250/20* (2013.01)

(58) Field of Classification Search
CPC ......... H01M 8/04671; H01M 8/04388; H01M 8/04402; H01M 8/1004; H01M 8/04664; H01M 2250/20; H01M 2008/1095
See application file for complete search history.

(56) References Cited

U.S. PATENT DOCUMENTS

| 8,343,679 B2 * | 1/2013 | Bono ................ H01M 8/04365 429/444 |
| 2012/0141891 A1 | 6/2012 | Kwon et al. |
| 2019/0198897 A1 | 6/2019 | Okamura et al. |

FOREIGN PATENT DOCUMENTS

| CN | 101855763 A | 10/2010 |
| JP | 2005-174694 A | 6/2005 |
| JP | 2010-073497 A | 4/2010 |
| JP | 2012-119300 A | 6/2012 |

(Continued)

OTHER PUBLICATIONS

Office Action dated Aug. 1, 2023 issued over the corresponding Japanese Patent Application 2020-025871 with English machine translation thereof.

(Continued)

*Primary Examiner* — Jennifer Bahls
*Assistant Examiner* — Quang X Nguyen
(74) *Attorney, Agent, or Firm* — Carrier, Shende & Associates P.C.; Joseph P. Carrier; Jeffrey T. Gedeon (57) ABSTRACT

A method of detecting degradation of a membrane electrode assembly in a fuel cell system is provided. In the method, it is possible to detect degradation (cross leakage) of a fuel cell. In the state where variation of a load is suppressed, variation of the gas pressure where a predetermined amount of the fuel gas is supplied from a fuel tank to a fuel cell is measured by a pressure sensor provided in a fuel gas circulation channel extending from the fuel gas outlet to the fuel gas inlet.

4 Claims, 7 Drawing Sheets

(56) References Cited

FOREIGN PATENT DOCUMENTS

| JP | 2013-246984 A | 12/2013 |
| JP | 2014-175056 A | 9/2014 |
| JP | 2018-060757 A | 4/2018 |
| JP | 2019-114351 A | 7/2019 |

OTHER PUBLICATIONS

Office Action dated Nov. 2, 2023 issued over the corresponding Chinese Patent Application No. 202110191258.4 with the English machine translation thereof.

* cited by examiner

METHOD OF DETECTING DEGRADATION OF MEMBRANE ELECTRODE ASSEMBLY IN FUEL CELL SYSTEM

CROSS-REFERENCE TO RELATED APPLICATION

This application is based upon and claims the benefit of priority from Japanese Patent Application No. 2020-025871 filed on Feb. 19, 2020, the contents of which are incorporated herein by reference.

BACKGROUND OF THE INVENTION

Field of the Invention

The present invention relates to a method of detection degradation of a membrane electrode assembly in a fuel cell system including a fuel cell which performs power generation by electrochemical reactions of a fuel gas supplied to an anode of the membrane electrode assembly and an oxygen-containing gas supplied to a cathode of the membrane electrode assembly.

Description of the Related Art

For example, a solid polymer electrolyte fuel cell includes a membrane electrode assembly (MEA) having an anode on one surface of an electrolyte membrane, and a cathode provided on the other surface of the electrolyte membrane. The electrolyte membrane is a polymer ion exchange membrane. The MEA is sandwiched between separators to form a power generation cell (unit cell). In general, a predetermined number of power generation cells are stacked together to form, e.g., an in-vehicle fuel cell stack mounted in a fuel cell vehicle (fuel cell electric automobile, etc.).

In the power generation cell, the fuel gas may be leaked to the cathode, or the oxygen-containing gas may be leaked to the anode. This phenomenon is referred to as the "cross leakage". If cross leakage occurs, the power generation performance is degraded.

For example, Japanese Laid-Open Patent Publication No. 2010-073497 (hereinafter referred to as JP2010-073497A) discloses a technique of detecting the cross leakage. In this technique, the voltage behavior in a target cell after stopping supply of at least one of reactant gases (a fuel gas and an oxygen-containing gas) is detected by voltage detection means. Then, based on the difference between the voltage behavior of a reference cell and the voltage behavior of the target cell after the stop of supplying the reactant gases, cross leakage of the target cell is detected by the cross leakage detection means. In this manner, it is possible to detect cross leakage of each cell (paragraph [0008] of JP2010-073497A).

SUMMARY OF THE INVENTION

According to JP2010-073497A, in the above technique, it is possible to detect the cross leakage accurately.

However, in JP2010-073497A, in order to detect cross leakage, it is required to measure the voltage behavior of the target cell. Since the voltage behavior of each cell is measured, the number of positions where measurement is required is large, and the measurement is laborious. Therefore, it takes considerable time to detect the cross leakage of the cells of the fuel cell stack.

The present invention has been made taking such a problem, and an object of the present invention is to provide a method of detecting degradation of a membrane electrode assembly in a fuel cell system in which it is possible to detect degradation (cross leakage) of a fuel cell easily, in a short period of time, and accurately.

According to one aspect of the present invention, a method of detecting degradation of a membrane electrode assembly in a fuel cell system is provided. The fuel cell system includes a fuel cell configured to perform power generation using a fuel gas supplied through a fuel gas supply channel being supplied from a fuel gas inlet to an anode of the membrane electrode assembly, a fuel exhaust gas from a fuel gas outlet being mixed with the fuel gas, and supplied to the fuel gas inlet, and an oxygen-containing gas being supplied from an oxygen-containing gas inlet to a cathode of the membrane electrode assembly, a load driven by electrical energy generated in the power generation of the fuel cell, and a pressure sensor provided in a fuel cell circulation channel extending from the fuel gas outlet to the fuel gas inlet. The method includes suppressing variation of the load, and in a state where variation of the load is suppressed, measuring variation of a gas pressure by the pressure sensor after supplying a predetermined amount of the fuel gas to the fuel cell.

In the present invention, in the state where variation of the load is suppressed, variation of the gas pressure when the predetermined amount of the fuel gas is supplied to the fuel cell is measured by the pressure sensor provided in the fuel gas circulation channel extending from the fuel gas outlet to the fuel gas inlet. In this manner, it is possible to detect degradation (cross leakage) of the membrane electrode assembly in the fuel cell system easily, in a short period of time, and accurately without providing any additional member for measurement.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of a method of detecting degradation of a membrane electrode assembly in a fuel cell system according to the present invention will be described with reference to the accompanying drawings.

Embodiment

[Structure]

Figure 1:
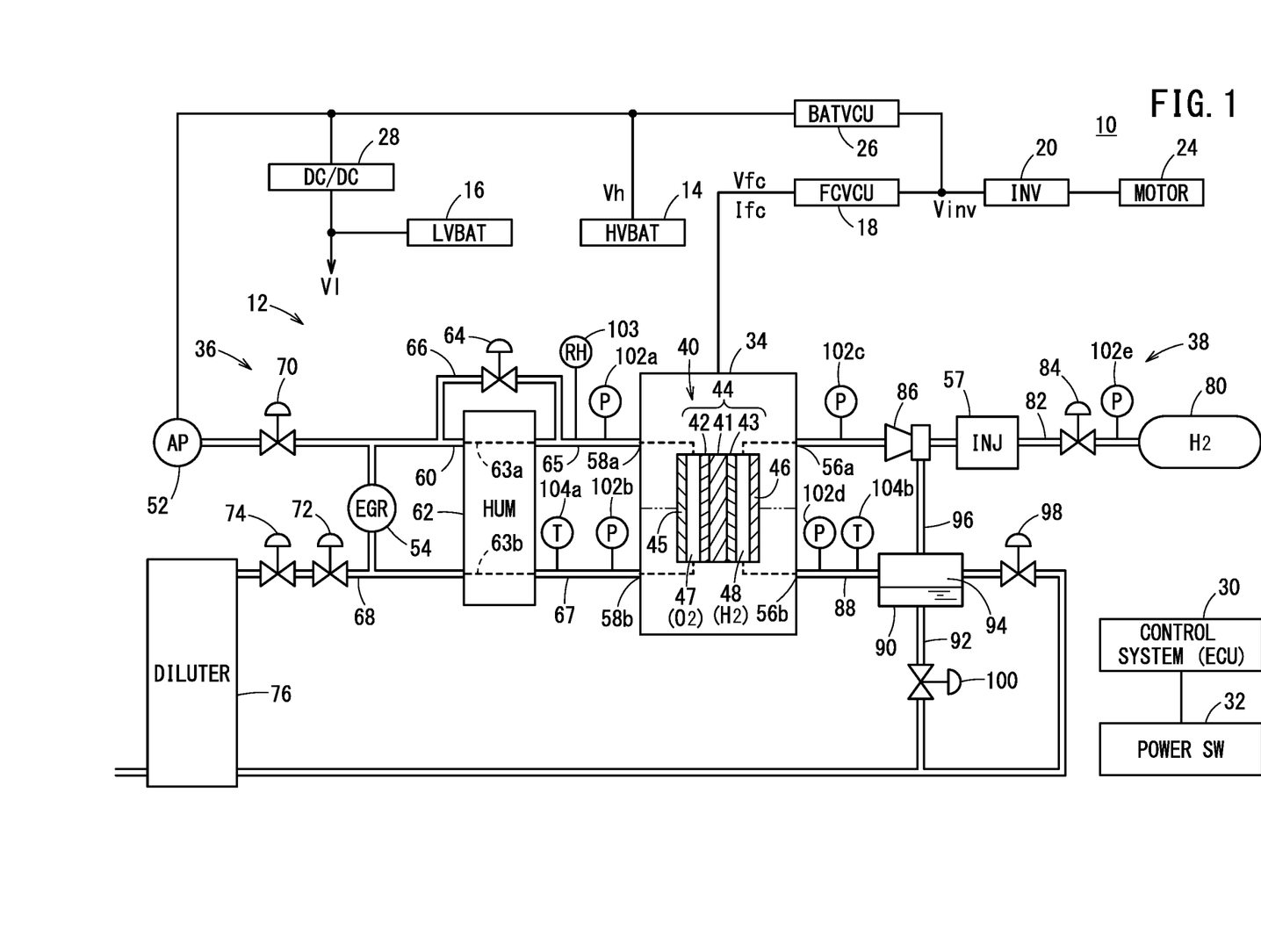
FIG. 1 is a block diagram showing an example of structure of a vehicle (fuel cell vehicle) equipped with a fuel cell system according to an embodiment in which a method of detecting degradation of a membrane electrode assembly in the fuel cell system is performed.

FIG. 1 is a block diagram schematically showing an example of structure of a vehicle (fuel cell vehicle) 10 equipped with a fuel cell system according to an embodiment in which a method of detecting degradation of a membrane electrode assembly in a fuel cell system 12 is performed.

For example, as shown in FIG. 1, the fuel cell vehicle 10 is a fuel cell electric automobile.

The fuel cell vehicle 10 includes, in addition to the fuel cell system 12, a high voltage battery (HVBAT: high voltage storage device) 14 for generating high voltage Vh of several hundred volts, a low voltage battery (LVBAT: low voltage storage device) 16 for generating low voltage Vl of about several tens of volts which is lower than the voltage of the high voltage battery 14, e.g., +12[V], a step-up converter (FCVCU: fuel cell voltage control unit) 18, an inverter (INV: drive device of a rotary machine) 20, a motor (rotary electric machine for driving the vehicle) 24, a step-up/step-down (bidirectional) converter (BATVCU: battery voltage control unit) 26, a step-down converter (DC/DC converter) 28, a control system (ECU) 30, and a power switch (power SW) 32.

Figure 2:
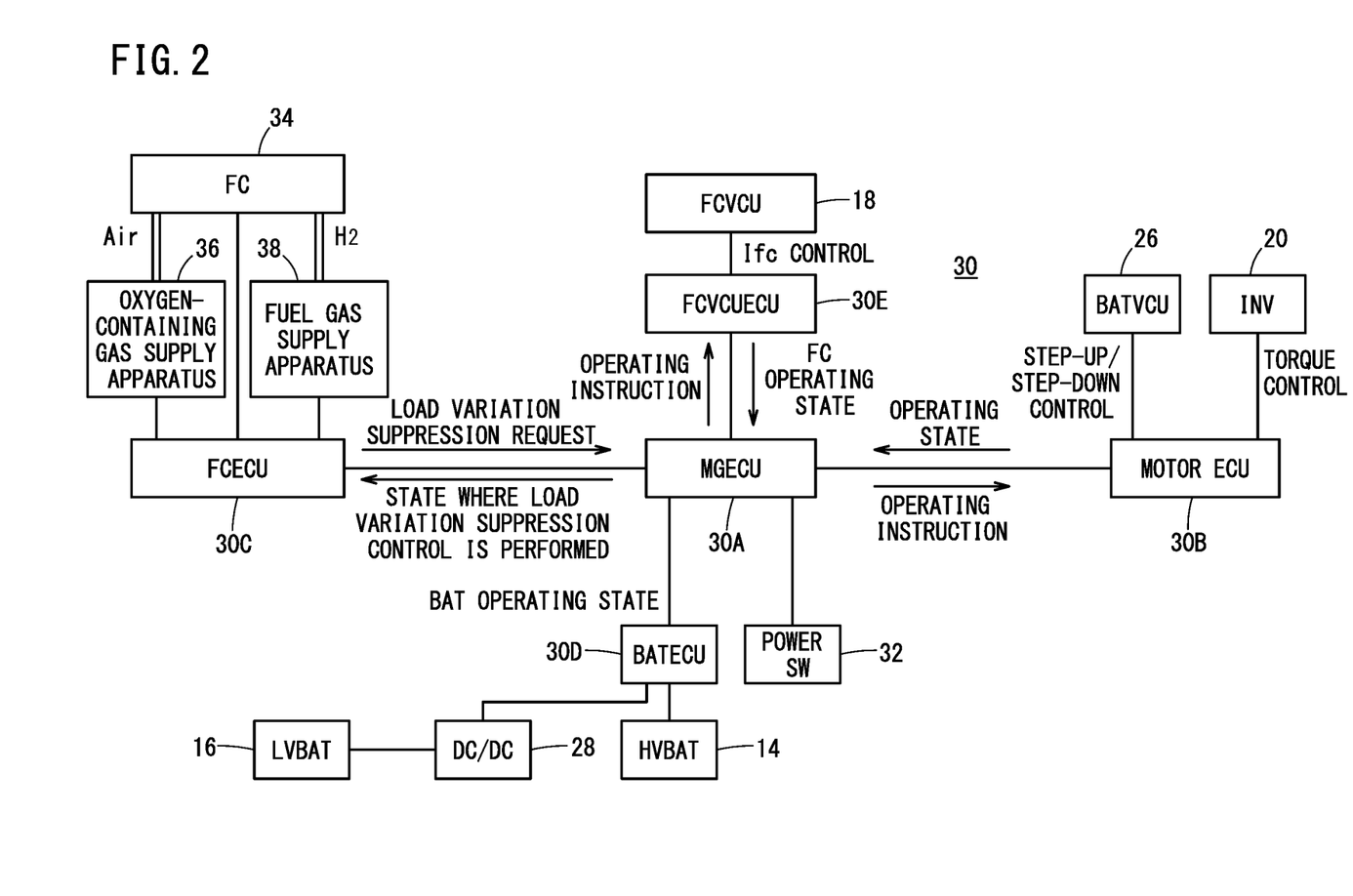
FIG. 2 is a block diagram schematically showing structure of a control system in FIG. 1.

FIG. 2 is a block diagram schematically showing structure of the control system 30 in FIG. 1. In FIG. 2, the constituent elements that are identical to those shown in FIG. 1 are labeled with the same reference numerals.

Each component of the control system 30 includes a managing ECU (MGECU) 30A made up of an ECU (electronic control unit), a motor ECU 30B, an FCECU 30C, a battery ECU (BATECU) 30D, and a step-up converter control ECU (FCVCUECU) 30E.

In each of the ECUs, a CPU executes a program stored in a memory to function as a various function control unit described later, and controls constituent elements of the fuel cell vehicle 10 including the fuel cell system 12 through a control line (including a wireless line).

In FIG. 1, basically, the fuel cell system 12 includes a fuel cell stack (fuel cells) 34, an oxygen-containing gas supply apparatus 36, and a fuel gas supply apparatus 38.

The oxygen-containing gas supply apparatus 36 supplies the oxygen-containing gas to the fuel cell stack 34, and the fuel gas supply apparatus 38 supplies the fuel gas to the fuel cell stack 34.

The fuel cell stack 34 is formed by stacking a plurality of power generation cells 40. Each of the power generation cells 40 includes a membrane electrode assembly 44 and separators 45, 46 sandwiching the membrane electrode assembly 44.

The membrane electrode assembly 44 includes a solid polymer electrolyte membrane 41, and a cathode 42 and an anode 43 provided on both sides of a solid polymer electrolyte membrane 41. For example, the electrolyte membrane 41 is a thin membrane of perfluorosulfonic acid containing water.

Each of the cathode 42 and the anode 43 includes a gas diffusion layer (not shown) of a carbon paper, etc. An electrode catalyst layer (not shown) is formed by depositing porous carbon particles uniformly on the surface of the gas diffusion layer, and platinum alloy is supported on surfaces of the carbon particles. The electrode catalyst layers are formed on both surfaces of the solid polymer electrolyte membrane 41.

One of separators 45, 46 (separator 45) has a cathode flow field (oxygen-containing gas flow field) 47 on its surface facing the membrane electrode assembly 44. The cathode flow field 47 is connected to an oxygen-containing gas inlet connection port (oxygen-containing gas inlet) 58a and an oxygen-containing gas outlet connection port (oxygen-containing gas outlet) 58b. That is, the fuel cell stack 34 includes the oxygen-containing gas inlet connection port 58a and the oxygen-containing gas outlet connection port 58b for supplying the oxygen-containing gas (e.g., the air) to the cathode 42 through the cathode flow field 47.

The other separator 46 has an anode flow field (fuel gas flow field) 48 on its surface facing the membrane electrode assembly 44. The anode flow field 48 is connected to a fuel gas inlet connection port (fuel gas inlet) 56a and a fuel gas outlet connection port (fuel gas outlet) 56b. That is, the fuel cell stack 34 includes a fuel gas inlet connection port 56a and a fuel gas outlet connection port 56b, for supplying a fuel gas (e.g., a hydrogen gas) to the anode 43 through the anode flow field 48.

It should be noted that the fuel cell stack 34 is provided with a coolant inlet connection port (not shown) and a coolant outlet connection port (not shown) for allowing a coolant (not shown) to flow in each of the power generation cells 40.

The output of the stacked power generation cells 40, i.e., the output of the fuel cell stack 34 (power generation electrical energy of the power generation voltage Vfc at high voltage) is supplied to the motor 24 through a step-up converter 18 and the inverter 20 under control of the control system 30, and can be charged in the high voltage battery 14 through the step-up converter 18 and the step-up/step-down converter (which functions as a step-down converter) 26.

Further, the output of the fuel cell stack 34 (power generation electrical energy of the power generation voltage Vfc) can be charged in a low voltage battery 16 through the step-up converter 18, the step-up/step-down converter (which functions as a step-down converter) 26, and the step-down converter 28.

At the time of the start-up time (at the time of starting operation) where the power switch 32 of the fuel cell vehicle 10 is switched from the OFF state to the ON state, or at the time of deceleration by controlling an accelerator pedal during travel of the fuel cell vehicle 10, the electrical energy of the high voltage battery 14 at high voltage Vh is capable of driving the motor 24 through the step-up/step-down converter (which functions as a step-up converter) 26 and the inverter 20.

In this manner, the motor 24 can be driven by electrical energy of the high voltage battery 14 and/or electrical energy (power running electrical energy) of the fuel cell stack 34. On the other hand, the regenerative electrical energy of the motor 24 generated at the time of deceleration is charged in the high voltage battery 14 through the inverter 20, and the step-up/step-down converter (functions as a step-down converter) 26.

Further, the electrical energy of the high voltage battery 14 at high voltage Vh can drive an air pump (AP, air compressor) 52 and/or air conditioner (not shown).

The electrical energy of the low voltage battery 16 at low voltage Vl is supplied to an exhaust gas recirculation pump (EGR pump) 54, an injector 57, the control system 30, and various solenoid valves described later, and additionally, supplied to low voltage loads such as a lighting device (not shown), etc.

The oxygen-containing gas supply apparatus 36 is provided with the air pump 52 in an oxygen-containing gas supply channel 60, for sucking the air from the atmospheric air, and compressing the air to supply the compressed air as an oxygen-containing gas to the fuel cell stack 34.

The oxygen-containing gas supply channel 60 is provided with a humidifier (HUM) 62 and a bypass channel 66 for bypassing the humidifier 62 through a bypass valve 64.

The oxygen-containing gas supply channel 60 is connected to the oxygen-containing gas inlet connection port 58a of the fuel cell stack 34 through the humidifier 62 and an oxygen-containing gas supply channel 65.

An oxygen-containing exhaust gas discharge channel 68 is connected to the oxygen-containing gas outlet connection port 58b through an oxygen-containing exhaust gas discharge channel 67 and the humidifier 62. The EGR pump 54 is provided between the oxygen-containing exhaust gas discharge channel 68 and the oxygen-containing gas supply channel 60.

At the time of stopping power generation of the fuel cell vehicle 10 where the power switch 32 is placed in the OFF state, the EGR pump 54 circulates some of the oxygen-containing exhaust gas (cathode off gas) which is a gas discharged from the oxygen-containing gas outlet connection port 58b back to the oxygen-containing gas inlet connection port 58a.

The air pump 52 is provided with an inlet seal valve 70 on a side where the oxygen-containing gas supply channel 60 is present.

The oxygen-containing exhaust gas discharge channel 68 is provided with an outlet seal valve 72, and a diluter 76 is connected to the downstream side of the outlet seal valve 72 through a back pressure control valve 74.

The fuel gas supply apparatus 38 includes a high pressure hydrogen tank 80 for storing high pressure hydrogen, and the high pressure hydrogen tank 80 is connected to the fuel gas inlet connection port 56a of the fuel cell stack 34 through a fuel gas supply channel 82. The fuel gas supply channel 82 is provided with an interruption valve (not shown), a regulator valve 84 for regulating the pressure of the fuel gas, the injector 57, and an ejector 86 arranged in series from the side where the hydrogen tank 80 is provided, in the flow direction of the hydrogen gas. It should be noted that two or more injectors 57 may be provided in parallel.

A fuel exhaust gas channel 88 is connected to a fuel gas outlet connection port 56b of the fuel cell stack 34. The fuel exhaust gas channel 88 is connected to a gas liquid separator 90, and the gas liquid separator 90 is provided with a drain channel 92 for discharging the liquid component (liquid water) and a gas channel 94 for discharging the gas components including hydrogen and nitrogen.

The gas channel 94 is connected to the ejector 86 through a circulation channel 96, and connected to the diluter 76 under opening operation of a purge valve 98. The drain channel 92 is connected to the diluter 76 through a drain valve 100.

The diluter 76 has a function of mixing a fuel exhaust gas discharged from the fuel gas outlet connection port 56b of the fuel cell stack 34 (anode off gas containing the hydrogen gas), and an oxygen-containing exhaust gas discharged from the oxygen-containing gas outlet connection port 58b of the fuel cell stack 34 (cathode off gas containing the oxygen) to dilute the hydrogen concentration to not more than a predetermined value.

Pressure sensors 102a, 102b, 102c, 102d, and 102e are disposed in the oxygen-containing gas supply channel 65, the oxygen-containing exhaust gas discharge channel 67, the fuel gas supply channel 82, the fuel exhaust gas channel 88, and on the outlet side of the high pressure hydrogen tank 80, respectively. A hygrometer 103 is disposed in the oxygen-containing gas supply channel 65. Thermometers 104a, 104b are disposed in the oxygen-containing exhaust gas discharge channel 67 and the fuel exhaust gas channel 88, respectively.

In the embodiment, for ease of understanding, the gas pressure (fuel gas pressure, hydrogen pressure) measured by a pressure sensor 102c disposed on the inlet side of the fuel gas inlet connection port 56a is referred to as the gas pressure PH. Data of the gas pressure PH is sent to the FCECU 30C.

An electric circuit including the high voltage battery 14, the low voltage battery 16, the step-up converter 18, the step-up/step-down converter 26, the step-down converter 28, and the inverter 20, etc. is provided with voltmeters, ammeters, and thermometers (not shown), and measurement values measured by voltmeters, ammeters, and thermometers are sent to the control system 30.

In FIG. 2, the FCECU 30C controls the oxygen-containing gas supply apparatus 36 (air pump 52, etc.) to control supply of the oxygen-containing gas to the fuel cell 34, and controls the fuel gas supply apparatus 38 (the interruption valve for interrupting supply of the hydrogen from the hydrogen tank 80, the regulator valve 84, the injector 57, etc.) for controlling the supply of the fuel gas to the fuel cell 34. Further, the FCECU 30C detects the state, etc. of the fuel cell 34 to the managing ECU 30A.

The step-up converter ECU 30E performs drive control of the step-up converter 18 based on operating instructions from the managing ECU 30A to control the power generation current Ifc of the fuel cell stack 34.

Since the fuel cell stack 34 has predetermined voltage/characteristics where, when the power generation voltage Vfc as the voltage applied between the terminals of the fuel cell stack 34 is increased, the power generation current Ifc is decreased, by performing control of fixing the power generation voltage Vfc of the fuel cell 34 by the step-up converter 18 through the step-up converter ECU 30E, it is possible to control the power generation current Ifc corresponding to the fixed power generation voltage Vfc to have a constant value in accordance with the voltage/current characteristics.

The step-up converter ECU 30E receives operating instructions from the managing ECU 30A, and sends data of the operating state (power generation electrical current Ifc, etc.) of the fuel cell 34 to the managing ECU 30A.

The motor ECU 30B receives an operating instruction from the managing ECU 30A, and performs torque control of the motor 24 through the inverter 20, and performs step-up control of the voltage applied from the high voltage battery 14 to the inverter 20 through the step-up/step-down converter 26. Further, at the time of regenerating electrical energy, the motor ECU 30B performs step-down control of decreasing the voltage of the regenerative voltage of the motor 24 through the step-up/step-down converter 26 to charge the electrical energy in the high voltage battery 14. It should be noted that data about the operating state of the motor 24, etc. is sent from the motor ECU 30B to the managing ECU 30A.

The battery ECU 30D performs charging/discharging control of the high voltage battery 14, and performs charging/discharging control of the low voltage battery 16 through the step-down converter 28. It should be noted that data of the operating state (BAT operating state) of the high voltage battery 14 and the low voltage battery 16 is sent from the battery ECU 30D to the managing ECU 30A.

[Normal Operation of the Fuel Cell Vehicle 10 During Travel, Etc.]

Figure 3:
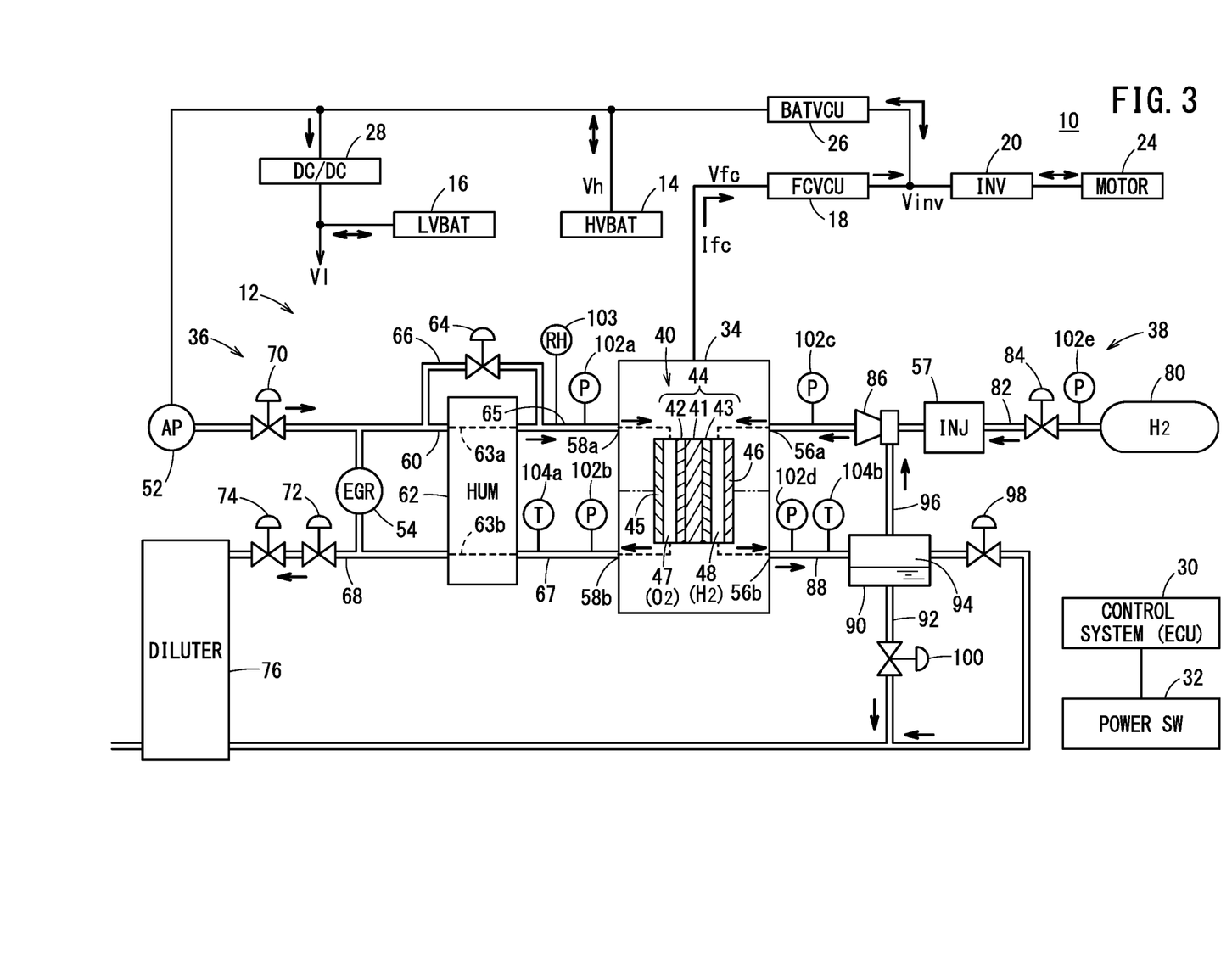
FIG. 3 is a block diagram with arrows used for illustrating power generation operation during normal travel of the fuel cell vehicle.

Normal operation during travel (power generation operation during normal travel such as travel in the city area, travel in the suburb area, and travel on the express way where acceleration/deceleration operation is performed) of the fuel cell vehicle 10 equipped with the fuel cell system 12 basically having the above structure will be described with reference to FIG. 3 which is created from the block diagram in FIG. 1 by including arrows indicating the flows of the fuel gas, the oxygen-containing gas, and electrical energy.

During normal operation where the power switch 32 is in the ON state, the oxygen-containing gas (air) is supplied from the air pump 52 operated using electrical energy at high voltage Vh to the oxygen-containing gas supply channel 60. After the oxygen-containing gas flows through the humidifier 62 or after the oxygen-containing gas flows through the bypass channel 66, and bypasses the humidifier 62, the oxygen-containing gas is supplied to the oxygen-containing gas inlet connection port 58a of the fuel cell stack 34.

It should be noted that the humidifier 62 includes a channel 63a as a passage of the oxygen-containing gas (dried air), and a channel 63b as a passage of the exhaust gas (humidified oxygen-containing exhaust gas, cathode off gas) from the oxygen-containing gas outlet connection port 58b of the fuel cell stack 34 flowing through the oxygen-containing gas outlet connection port 58b of the fuel cell stack 34 and the oxygen-containing exhaust gas discharge channel 67, and the humidifier 62 has a function of humidifying the oxygen-containing gas supplied from the air pump 52. That is, the humidifier 62 moves water component contained in the oxygen-containing exhaust gas to the supply gas (oxygen-containing gas) through a porous membrane.

The humidification at this time is set to a humidification amount in such a degree where solid polymer electrolyte membrane 41 is humidified, and the power generation performance is suitably exerted in the fuel cell stack 34. Determination of the humidification amount is performed by controlling the opening degree of the bypass valve 64 by the control system 30 with reference to the hygrometer 103.

On the other hand, in the fuel gas supply apparatus 38, the fuel gas from the hydrogen tank 80 where the gas pressure is controlled by the regulator valve 84 under the control of the control system 30 is discharged into the fuel gas supply channel 82 under the open/close control of the injector 57 by the control system 30. The fuel gas is mixed with the fuel exhaust gas sucked into the ejector 86 through the circulation channel 96, and discharged from the ejector 86. Then, the fuel gas is supplied to the fuel gas inlet connection port 56a of the fuel cell stack 34. It should be noted that, in addition to the ejector 86 for circulating the fuel exhaust gas, a circulation pump, so called a hydrogen circulation pump may be provided in the circulation channel 96.

In the fuel cell stack 34, the oxygen-containing gas is supplied from the oxygen-containing gas inlet connection port 58a to the cathode 42 through the cathode flow field 47 of each of the power generation cells 40. In the meanwhile, the hydrogen gas is supplied from the fuel gas inlet connection port 56a to the anode 43 through the anode flow field 48 of each of the power generation cells 40. Therefore, in each of the power generation cells 40, the air supplied to the cathode 42 and the hydrogen gas supplied to the anode 43 are partially consumed in electrochemical reactions in the electrode catalyst layers to perform power generation.

Then, the oxygen-containing exhaust gas which is the air supplied to, and partially consumed at the cathode 42, and the water produced in the reaction are discharged into the oxygen-containing gas outlet connection port 58b, and flows through the oxygen-containing exhaust gas discharge channel 68 into the diluter 76. Likewise, the hydrogen gas supplied to, and partially consumed at the anode 43 is discharged as the fuel exhaust gas (after some of the fuel gas has been consumed) into the fuel gas outlet connection port 56b. After the fuel exhaust gas flows from the fuel exhaust gas channel 88 into the gas liquid separator 90 to remove the liquid component (liquid water), the fuel exhaust gas is sucked from the gas channel 94 into the ejector 86 through the circulation channel 96.

The electric energy of the power generation voltage Vfc at high voltage generated in power generation of the fuel cell stack 34 formed by connecting a plurality of power generation cells 40 electrically together in series is converted into the electric energy of the higher voltage (drive voltage) Vinv to obtain the required drive torque of the motor 24 through the step-up converter 18 under the control of the control system 30, and supplied to the input side of the inverter 20.

The duty of the inverter 20 is controlled based on the opening degree of an accelerator pedal (not shown) (accelerator pedal opening degree) through the control system 30 to drive the motor 24 by three-phase PWM driving. As a result, the fuel cell vehicle 10 travels.

In the case where there is extra electrical energy of the power generation voltage Vfc generated in power generation of the fuel cell stack 34, under the control of the control system 30, the extra electric energy is charged in the high voltage battery 14 at the high voltage Vh through the step-up/step-down converter 26, and the electrical energy of high voltage Vh is converted into electrical energy of low voltage Vl through the step-down converter 28, and then, charged in a low voltage battery 16.

The electrical energy of the high voltage battery 14 at high voltage Vh is supplied to the motor 24, and additionally, supplied to high voltage loads such as the air pump 52, and an air conditioner (not shown), etc.

The electric energy of the low voltage battery 16 at low voltage Vl is supplied to low voltage loads such as the control system 30, and the injector 57, etc.

Each SOC of the high voltage battery 14 and the SOC of low voltage battery 16 (state of charge: the SOC indicates the amount of charged electrical energy where 100[%] indicates the "full charge state") is calculated by the control system 30 based on the voltage detected by the voltmeter, the electric current detected by the ammeter, and the temperature detected by the thermometer, with reference to a map (not shown).

[Operation of Detecting Degradation of the Membrane Electrode Assembly 44 in the Fuel Cell System 12 of the Fuel Cell Vehicle 10]

Normal operation of the fuel cell system 12 during the travel, etc. has been described above. Next, a method of detecting degradation of the membrane electrode assembly in the fuel cell system according to main part of the present invention will be described in relation to the fuel cell vehicle 10 equipped with the fuel cell system 12 which performs this method, with reference to a flow chart of FIG. 4.

Figure 4:
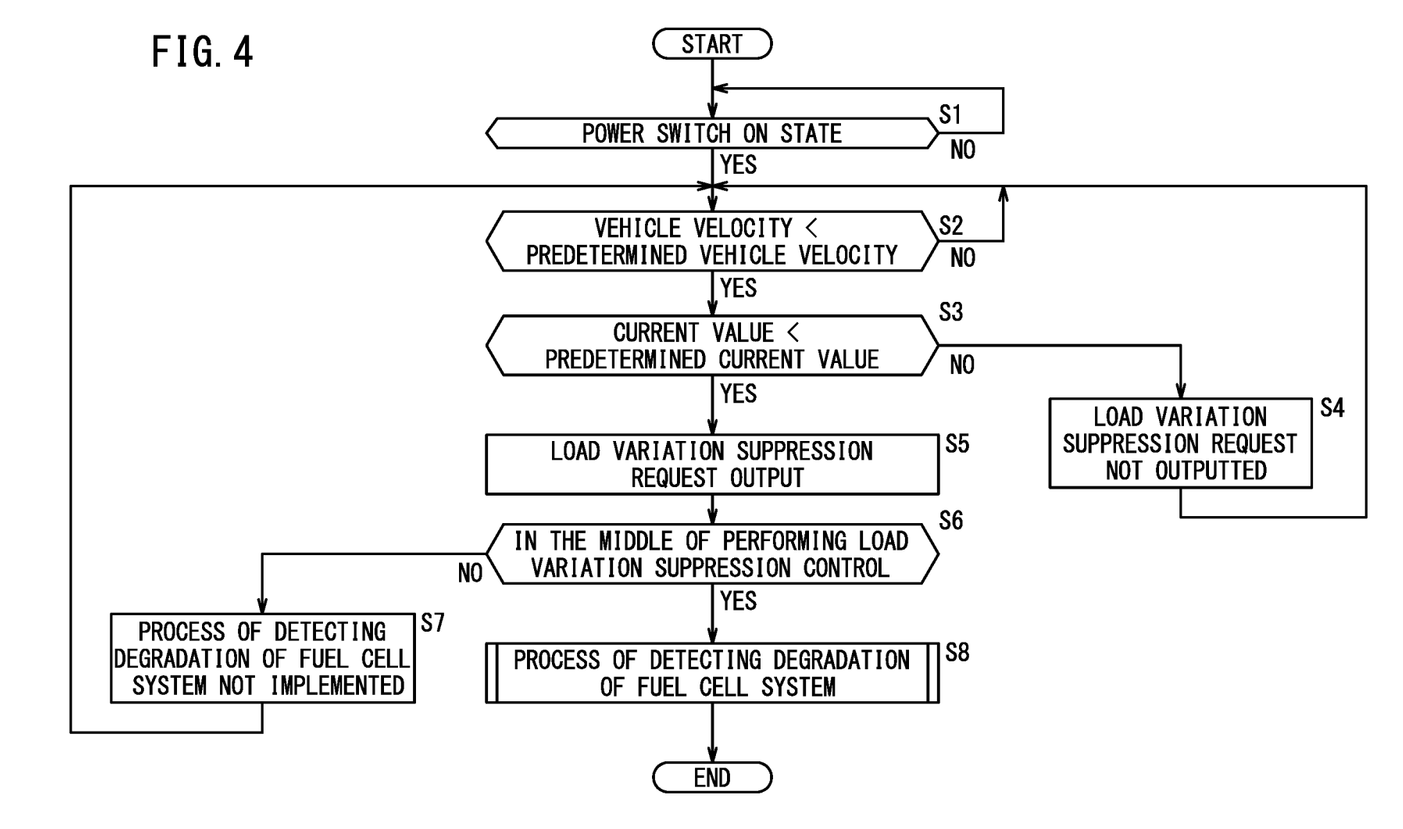
FIG. 4 is a flow chart used for illustrating a method of detecting degradation of the membrane electrode assembly in the fuel cell system according to the embodiment.

In step S1, the managing ECU 30A determines whether or not the power switch 32 is in the ON state. When the power switch 32 is in the ON state (step S1: YES), in step S2, vehicle velocity information is obtained from the motor ECU 30B into which an encode signal is inputted from an encoder (not shown) of the motor 24, and it is determined whether or not the vehicle velocity is not more than a predetermined vehicle velocity.

In the embodiment, it is assumed that the fuel cell vehicle 10 is in the stop state (step S2: YES), and the fuel cell stack 34 is in the so called idle power generation state.

Then, in step S3, it determined whether or not the value of the power generation electrical current Ifc outputted from the fuel cell stack 34 is less than a predetermined current value (threshold current value) Ith (Ifc<Ith).

If the power generation current value Ifc is not more than the predetermined current value Ith (step S3: NO), i.e., in the case where the value of the power generation current Ifc is large electrical current which is larger than the predetermined current value Ith, even if a degradation detection process (step S8) described later is performed, the detection accuracy is bad. Therefore, in step S4, it is confirmed that the load variation suppression request is not outputted, and the routine returns to step S2.

On the other hand, in the case where the value of the power generation current Ifc is less than the predetermined current value Ith (step S3: YES, Ifc<Ith), in step S5, the load variation suppression request is outputted from the FCECU 30C, and after the managing ECU 30A detects the load variation suppression request, in step S6, the managing ECU 30A confirms the operating state of each of the ECUs (the FCECU 30C, the step-up converter ECU 30E, the motor ECU 30B, and the battery ECU 30D).

Then, in the case where it is possible to perform the load variation suppression control (low load power control) of the fuel cell stack 34 based on the confirmed operating state (step S6: YES), under the control of the step-up converter ECU 30E, the input voltage of the step-up converter 18, i.e., the value of the power generation voltage (fuel cell voltage) Vfc is maintained in a manner that the value of the power generation current Ifc becomes not more than the predetermined current value (threshold current value) Ith, and the routine proceeds to the process of detecting degradation of the fuel cell system 12 in step S8.

It should be noted that, in the case where it is determined that the load variation suppression control (low load power control) is not possible (step S6: NO), in step S7, the process of detecting degradation of the fuel cell system 12 is considered to be not performed, and the routine returns to step S2.

Figure 5:
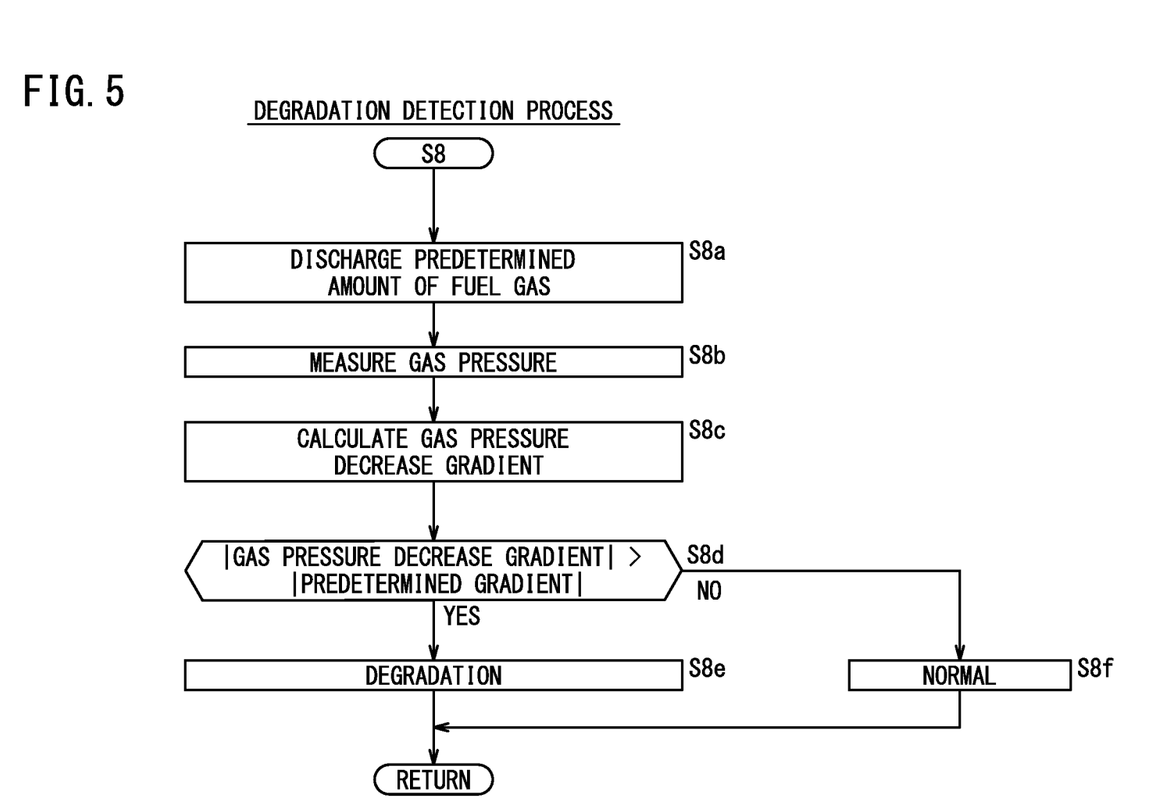
FIG. 5 is a flow chart used for illustrating the detail of a degradation detection process in FIG. 4.

FIG. 5 is a flow chart illustrating the detail of the process of detecting degradation of the fuel cell system 12 in step S8.

Figure 6A:
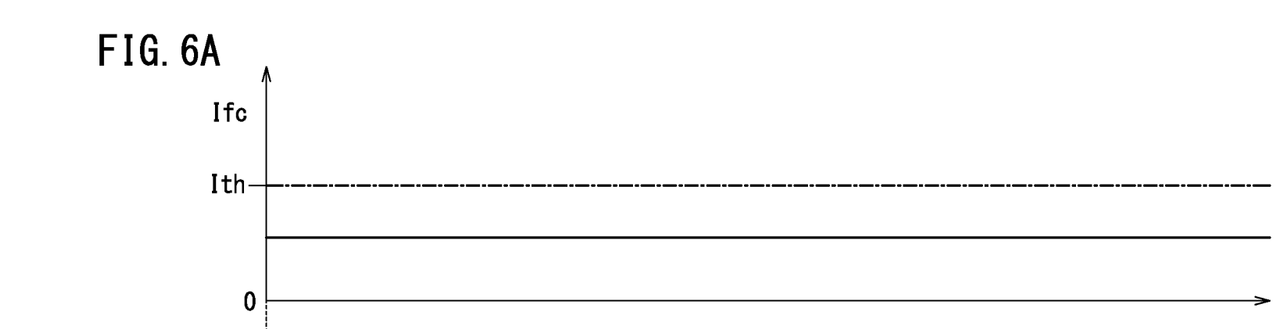
FIGS. 6A, 6B, and 6C are timing charts used for illustrating a method of detecting degradation of the membrane electrode assembly in the fuel cell system according to the embodiment.
Figure 6B:
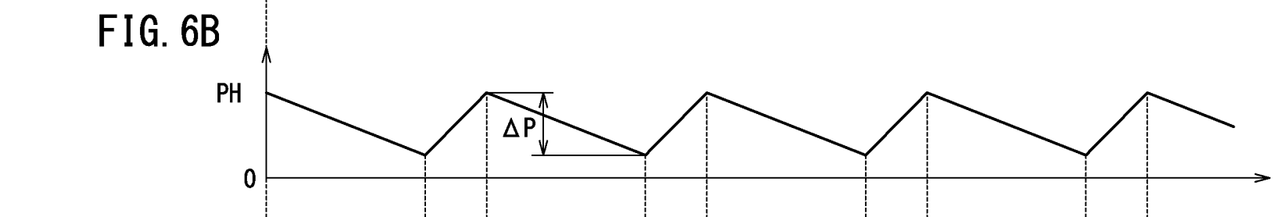
Figure 6C:
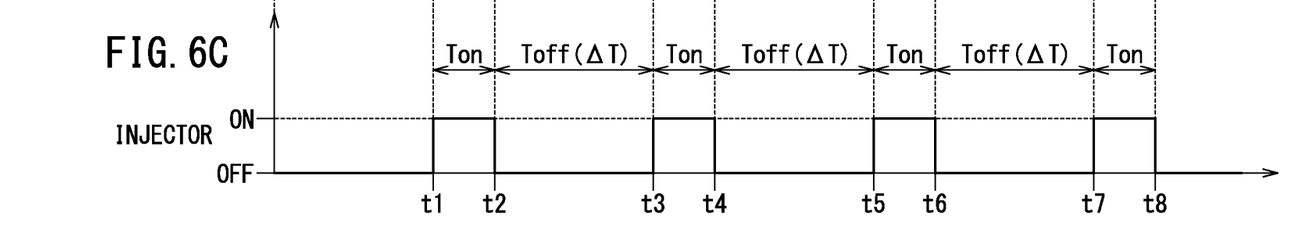

FIGS. 6A, 6B, 6C are timing charts used for illustrating the degradation detection process of the fuel cell system 12 in step S8.

In step S8a, in the low load state where load variation shown in FIG. 6A is suppressed (Ifc<Ith: step S3: YES), as shown in FIG. 6C, FCECU 30C intermittently places the injector 57 in the ON state (the time point t1 to the time point t2=Ton: ON, the time point t2 to the time point t3=Toff: OFF), and a predetermined amount of the fuel gas is discharged during the ON segment Ton, and the fuel gas is supplied to the fuel gas inlet connection port 56a through the ejector 86.

Next, in step S8b, the drop value of the gas pressure PH during power generation in the OFF segment (time point t2 to the time point t3=ΔT) after gas discharging is measured as the gas pressure ΔP by the pressure sensor 102c (see FIG. 6B). The OFF segment is a period in the order of ms (millisecond).

Then, in step S8c, the decrease gradient of the gas pressure PH in the OFF segment (ΔT) after gas discharging is calculated as ΔP/ΔT.

Next, in step S8d, it is determined whether or not the calculated decrease gradient |ΔP/ΔT| exceeds the predetermined gradient |Sth|(|ΔP/ΔT|>|Sth|).

In the case where the condition of |ΔP/ΔT|>|Sth| is satisfied (step S8d: YES), in step S8e, it is determined that the fuel gas from the anode 43 where the pressure is relatively high is leaked to the cathode 42 where the pressure is relatively low, i.e., cross leakage occurs, and degradation of the membrane electrode assembly 44 occurs.

On the other hand, in the case where |ΔP/ΔT|≤|Sth| and the above condition is not satisfied, in step S8f, it is determined that no cross leakage occurs, and the membrane electrode assembly 44 is normal.

Figure 7A:
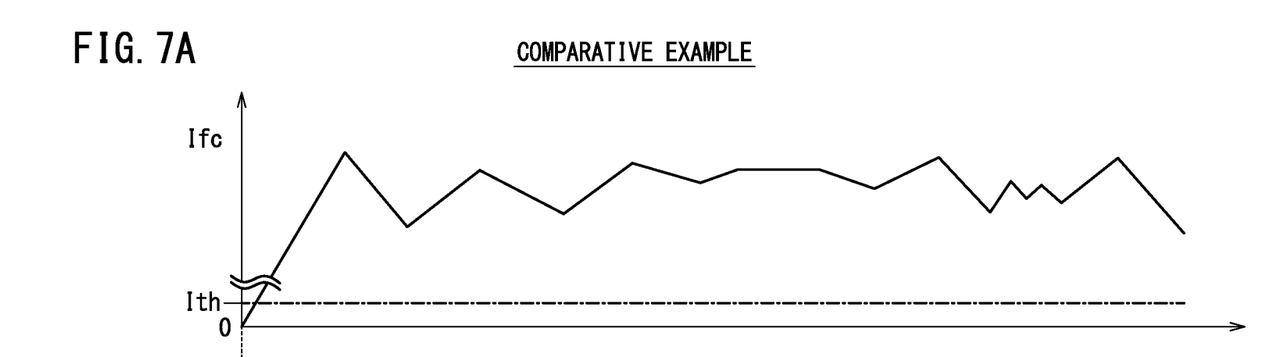
FIGS. 7A and 7B are timing charts used for illustrating a method of detecting degradation of a membrane electrode assembly in a fuel cell system according to a comparative example.
Figure 7B:
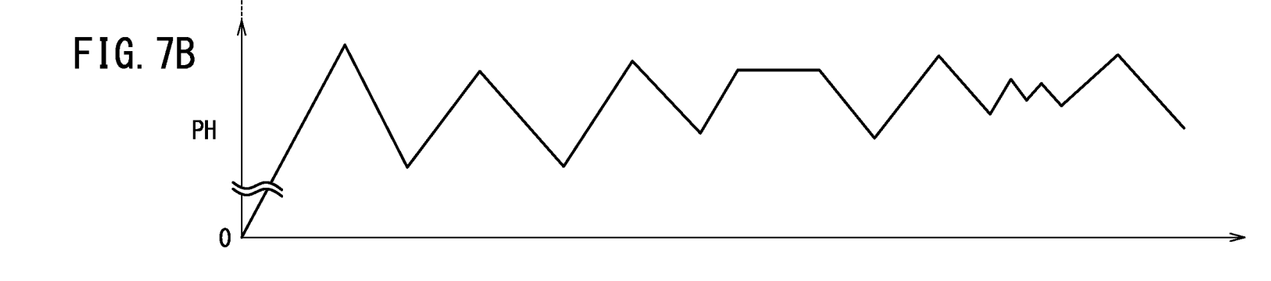

FIGS. 7A and 7B are timing charts of a comparative example. As shown in FIG. 7A, in the case where the value of the power generation current Ifc is not more than the predetermined current value Ith of small current (step S3: NO), since it is required to discharge the fuel gas in correspondence with the power generation current Ifc, as shown in FIG. 7B, variation of the gas pressure PH detected by the pressure sensor 102c becomes large, and it is nearly impossible to identify, and measure the pressure drop value of the gas pressure PH in the OFF segment after gas discharging (segment corresponding to the time point t2 to the time point t3=ΔT in FIGS. 6B and 6C) by the pressure sensor 102c. As a result, it is not possible to accurately detect degradation of the membrane electrode assembly 44.

That is, in the case where the load variation is large, since the pressure variation becomes large in accordance with the load variation, on the premise of Ifc<Ith (load limit) described with reference to FIGS. 6A, 6B, and 6C, the detection accuracy by the pressure drop method is degraded significantly, and it becomes difficult to discern the difference from the case where the gas pressure is decreased due to degradation of the membrane electrode assembly 44.

Invention Understood from the Embodiment

Hereinafter, the invention understood from the above embodiment will be described below. For ease of understanding, the constituent elements are labelled with the reference numbers used in the embodiment. However, the constituent elements are not limited to those labelled with the reference numerals.

According to the present invention, the method of detecting degradation of the membrane electrode assembly 44 in the fuel cell system 12 is provided. The fuel cell system 12 includes the fuel cell 34 configured to perform power generation using the fuel gas supplied through the fuel gas supply channel 82 being supplied from the fuel gas inlet 56a to the anode 43 of the membrane electrode assembly 44, the fuel exhaust gas from the fuel gas outlet 56b being mixed with the fuel gas, and supplied to the fuel gas inlet 56a, and the oxygen-containing gas being supplied from the oxygen-containing gas inlet 58a to the cathode 42 of the membrane electrode assembly 44, and the fuel cell system 12 includes the load 24 driven by electrical energy generated in the power generation of the fuel cell 34, and the pressure sensor 102c provided in the fuel gas circulation channel 96 extending from the fuel gas outlet 56b to the fuel gas inlet 56a. The method includes the suppressing variation of the load (steps S5 and S6), and in the state where variation of the load is suppressed, measuring variation of the gas pressure by the pressure sensor 102c after supplying a predetermined amount of the fuel gas to the fuel cell 34 (step S8b).

As described above, in the state where variation of the load is suppressed, the change of the pressure after the predetermined amount of the fuel gas is suppled to the fuel cell 34 is measured by the pressure sensor 102c provided in the fuel gas circulation channel 96 extending from the fuel gas outlet 56b to the fuel gas inlet 56a, it is possible to detect degradation (cross leakage) of the membrane electrode assembly 44 in the fuel cell system 12 easily, in a short period of time, and accurately without providing any additional member for measurement.

In this case, the injector 57 and the ejector 86 are provided in series in the fuel gas supply channel 82, the ejector 86 discharges into the fuel gas inlet 56a the fuel gas supplied from the injector 57 and the fuel exhaust gas sucked and mixed with the fuel gas, and the injector 57 is configured to supply the predetermined amount of the fuel gas.

In the structure, under the opening/closing control of the injector 57, it is possible to supply a predetermined small amount of fuel gas to the fuel cell 34 easily.

It should be noted that since the pressure sensor 102c is provided between the discharge port of the ejector 86 and the fuel gas inlet 56a, it is not required to provide any additional pressure sensor for measuring the gas pressure.

In this regard, it is preferable to further include the determining the presence/absence of degradation of the membrane electrode assembly 44 based on a decrease amount in the detected pressure ΔP measured by the pressure sensor 102c within the predetermined time period Toff (ΔT) (step S8d).

In the structure, it is possible to perform the degradation detection process in the middle of performing the load variation suppression control (step S6).

Further, preferably, the load includes the rotary electric machine 24, and in the load variation suppression step of suppressing variation of the load (step S6: YES), supply of electrical energy to the rotary electric machine 24 is stopped.

Since it is possible to detect the detection pressure ΔP having a stable value during idle power generation at the low load when the rotary machine 24 is in the rotation stop state, it is possible to improve the detection accuracy.

The present invention is not limited to the above described embodiment. It is a matter of course that various structures can be adopted based on the description of this specification.

What is claimed is:

1. A method of detecting degradation of a membrane electrode assembly in a fuel cell system, the fuel cell system comprising:
    a fuel cell configured to perform power generation using a fuel gas supplied from an injector through a fuel gas supply channel being supplied from a fuel gas inlet to an anode of the membrane electrode assembly, a fuel exhaust gas from a fuel gas outlet being mixed with the fuel gas, and supplied to the fuel gas inlet, and an oxygen-containing gas being supplied from an oxygen-containing gas inlet to a cathode of the membrane electrode assembly;
    a load driven by electrical energy generated in the power generation of the fuel cell; and
    a pressure sensor provided in a fuel cell circulation channel extending from the fuel gas outlet to the fuel gas inlet,
    the method comprising:
    suppressing variation of the load in a case where the fuel cell outputs a power generation current at a value less than a predetermined current value;
    in a state where variation of the load is suppressed, measuring variation of a gas pressure by the pressure sensor after supplying a predetermined amount of the fuel gas from the injector to the fuel cell; and
    determining presence/absence of degradation of the membrane electrode assembly based on a decrease amount in the detected pressure measured by the pressure sensor within a predetermined time period.

2. The method of detecting degradation of the membrane electrode assembly in the fuel cell system according to claim 1, wherein the injector and the ejector are provided in series in the fuel gas supply channel;
    the ejector discharges into the fuel gas inlet the fuel gas supplied from the injector and the fuel exhaust gas sucked and mixed with the fuel gas; and
    the injector is configured to supply the predetermined amount of the fuel gas.

3. The method of detecting degradation of the membrane electrode assembly in the fuel cell system according to claim 2, wherein the pressure sensor is provided between a discharge port of the ejector and the fuel gas inlet.

4. The method of detecting degradation of the membrane electrode assembly in the fuel cell system according to claim 1, wherein the load includes a rotary electric machine;
    in the suppressing variation of the load, supply of electrical energy to the rotary electric machine is stopped.

* * * * *